United States Patent
Weng

(10) Patent No.: US 7,751,782 B2
(45) Date of Patent: Jul. 6, 2010

(54) RADIO FREQUENCY SIGNAL TRANSCEIVER DEVICE CAPABLE OF ENHANCING TRANSMISSION AND RECEPTION PERFORMANCE OF MOBILE COMMUNICATION DEVICE

(75) Inventor: Jung-Tsan Weng, Tai-Nan County (TW)

(73) Assignee: Qisda Corporation, Taoyuan County (TW)

( * ) Notice: Subject to any disclaimer, the term of this patent is extended or adjusted under 35 U.S.C. 154(b) by 515 days.

(21) Appl. No.: 11/836,780

(22) Filed: Aug. 10, 2007

(65) Prior Publication Data

US 2008/0039044 A1 Feb. 14, 2008

(30) Foreign Application Priority Data

Aug. 11, 2006 (TW) .............................. 95129581 A

(51) Int. Cl.
*H04B 1/44* (2006.01)
(52) U.S. Cl. .................... 455/78; 455/293; 455/127.1; 455/126; 455/343.1; 455/79; 455/83; 455/254; 455/180.1; 333/133; 333/101; 333/126; 370/329; 370/280; 725/72; 330/51
(58) Field of Classification Search ................ 455/293, 455/127.1, 126, 343.1, 79, 83, 254, 180.1; 333/133, 101, 126; 370/329, 280; 343/890; 725/72; 330/51
See application file for complete search history.

(56) References Cited

U.S. PATENT DOCUMENTS

| 5,835,853 | A | * | 11/1998 | Enoki et al. .............. 455/180.1 |
| 6,111,459 | A | * | 8/2000 | Nishijima et al. ............. 330/51 |
| 6,313,699 | B1 | * | 11/2001 | Nishijima et al. ............. 330/51 |
| 6,313,700 | B1 | * | 11/2001 | Nishijima et al. ............. 330/51 |
| 6,489,843 | B1 | * | 12/2002 | Nishijima et al. ............. 330/51 |
| 6,995,630 | B2 | * | 2/2006 | Satoh et al. .................. 333/133 |
| 7,003,272 | B1 | * | 2/2006 | Mader et al. ................. 455/254 |
| 7,379,717 | B1 | * | 5/2008 | Haab et al. ................ 455/127.1 |
| 2003/0145328 | A1 | * | 7/2003 | Rabinowitz et al. ........... 725/72 |
| 2004/0071111 | A1 | * | 4/2004 | Satoh et al. .................. 370/329 |
| 2008/0198776 | A1 | * | 8/2008 | Seo ............................ 370/280 |

* cited by examiner

*Primary Examiner*—Matthew D Anderson
*Assistant Examiner*—April G Gonzales

(57) ABSTRACT

A radio-frequency signal receiver capable of enhancing reception performance includes an antenna for receiving radio-frequency signals, a first switch having an end coupled to the antenna, a filter coupled to the first switch, a second switch having an end coupled to the first switch and an end coupled to the filter, a low noise amplifier coupled to the second switch for amplifying signals received from the second switch, a frequency down converter coupled to the low noise amplifier for down-converting a frequency of signals outputted from the low noise amplifier, a signal processing circuit coupled to the frequency down converter for performing signal processing, and a control circuit for controlling the first and the second switches.

13 Claims, 5 Drawing Sheets

RADIO FREQUENCY SIGNAL TRANSCEIVER DEVICE CAPABLE OF ENHANCING TRANSMISSION AND RECEPTION PERFORMANCE OF MOBILE COMMUNICATION DEVICE

BACKGROUND OF THE INVENTION

1. Field of the Invention

The present invention relates to a radio-frequency signal transceiver device capable of enhancing transmission and reception performance, and more particularly, a radio-frequency signal transceiver device capable of increasing signal power by receiving and transmitting radio-frequency signals without passing through filters.

2. Description of the Prior Art

As radio-frequency communications technology progresses, mobile phones have changed communication ways. Using a mobile phone, a user can exchange information with a destination anytime and anywhere, so that the user can call out for rescue in emergency. In the prior art, transmission and reception efficiencies of the mobile phone are highly related to distance, topography, buildings, etc. between the mobile phone and a nearest base station. Therefore, if the user goes deep into a mountain or other pathless places, the mobile phone may lose efficacy due to weak signal power. In this case, once the user suffers emergencies, such as landslide and robbery, the user cannot contact with lifesavers, and may loss the chance of being rescued.

Solutions of the above-mentioned problem are increasing base stations or improving the transmission and reception efficiencies of the mobile phone. The former one may increase cost of a system, while the latter one may cause the mobile phone failing in electromagnetic authentications or interfering with electronic devices. For example, FIG. 1 illustrates a schematic diagram of a transceiver device 10. The transceiver device 10 can be applied to a mobile communications device, such as mobile phones, personal digital assistants (PDA), etc. The transceiver device 10 includes an antenna 100, a transceiver switch module 102, a surface wave filter 104, a low noise amplifier 106, a frequency down-converter 108, a power amplifier 110, a frequency up-converter 112, and a signal processing module 114. The transceiver switch module 102 includes a switch 115, and filters 116 and 118. When the transceiver device 10 performs receiving, the switch 115 switches the antenna 100 to couple to the filter 116 according to a control signal Vc. Signals received from the antenna 100 pass through the filter 116 and the surface wave filter 104 for filtering noise, and the low noise amplifier 106 amplifies the filtered signals. Then, the frequency down-converter 108 converts frequencies of signals outputted from the low noise amplifier 106 into a range of baseband frequencies for the signal processing module 114 and transmits the signals such as sounds, messages, or images to the signal processing module 114. On the other hand, when the transceiver device 10 performs transmitting, the antenna 100 is switched to couple to the filter 118. The baseband signals outputted from the signal processing module 114 are converted to a frequency range of radio frequencies by the frequency up-converter 112. The power amplifier 110 amplifies the power of the signals, and the filter 118 filters noise of the amplified signals for preventing from interfering with other electronic devices. Then, the signals are transmitted into the air through the antenna 100.

Therefore, if the transmission and reception performance of the transceiver device 10 has to be enhanced, the transmission performance can be enhanced by increasing the gain of the power amplifier 110, but the only way to enhance the reception performance is to reduce power loss of the surface wave filter 104 and the transceiver switch module 102 due to physical limitations. However, increasing the gain of the power amplifier 110 will cause the mobile phone not only interfering with other electronic devices, but also failing in electromagnetic authentications.

SUMMARY OF THE INVENTION

The present invention discloses a radio-frequency signal reception device of a mobile communications device, which comprises an antenna for receiving radio-frequency signals, a first switch comprising a first end coupled to the antenna, a second end, and a third end, a filter coupled to the third end of the first switch for filtering noise, a second switch comprising a first end, a second end coupled to the second end of the first switch, and a third end coupled to the filter, a low noise amplifier coupled to the second switch for amplifying signals received by the second switch, a frequency down-converter coupled to the low noise amplifier for down-converting frequencies of signals outputted from the low noise amplifier, a signal processing circuit coupled to the frequency down-converter for performing signal processing, and a control circuit for controlling the first and the second switches for selectively passing the signals through the filter.

The present invention further discloses a radio-frequency signal transmission device of a mobile communications device, which comprises a signal processing circuit for generating signals, a frequency up-converter coupled to the signal processing circuit for up-converting frequencies of signals outputted from the signal processing circuit, a power amplifier coupled to the frequency up-converter for amplifying power of received signals, a second switch coupled to the power amplifier, and comprising three ends, a filter coupled to the second switch for filtering noise, a first switch comprising a first end coupled to the antenna, a second end coupled to the second switch, and a third end coupled to the filter, and a control circuit for controlling the first and second switches for selectively passing the signals through the filter.

The present invention further discloses a radio-frequency signal transceiver device of a mobile communications device, which comprises an antenna for receiving and transmitting signals, a signal processing module comprising a baseband module, a receiving module, and a transmitting module, a first switch, a second switch comprising a first end coupled to the antenna, and a second end coupled to the first switch, a first filter coupled to the first switch for filtering noise, a second filter coupled to the first switch for filtering noise, a third switch comprising a first end coupled to the signal processing module, a second end coupled to the second switch, and a third end coupled to the first filter, a fourth switch comprising a first end coupled to a signal processing module, a second end coupled to second switch, and a third end coupled to the second filter, and a control circuit for controlling the first switch, the second switch, the third switch, and the fourth switch.

The present invention further discloses a radio-frequency signal transceiver device of a mobile communications device, which comprises an antenna for receiving or transmitting signals, a signal processing module comprising a baseband module, a receiving module, and a transmitting module, a first switch, a first filter coupled to the first switch for filtering noise, a second switch comprising a first end coupled to the receiving module, a second end coupled to the first switch, and a third end coupled to the first filter, a third switch, a second filter coupled to the third switch for filtering noise, a fourth switch comprising a first end coupled to the signal processing module, a second end coupled to the third switch, and a third end coupled to the second filter, a fifth switch comprising a first end coupled to the antenna, a second end coupled to the first switch, and a third end coupled to the third switch, and a control circuit for controlling the first switch, the second switch, the third switch, the fourth switch, and the fifth switch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
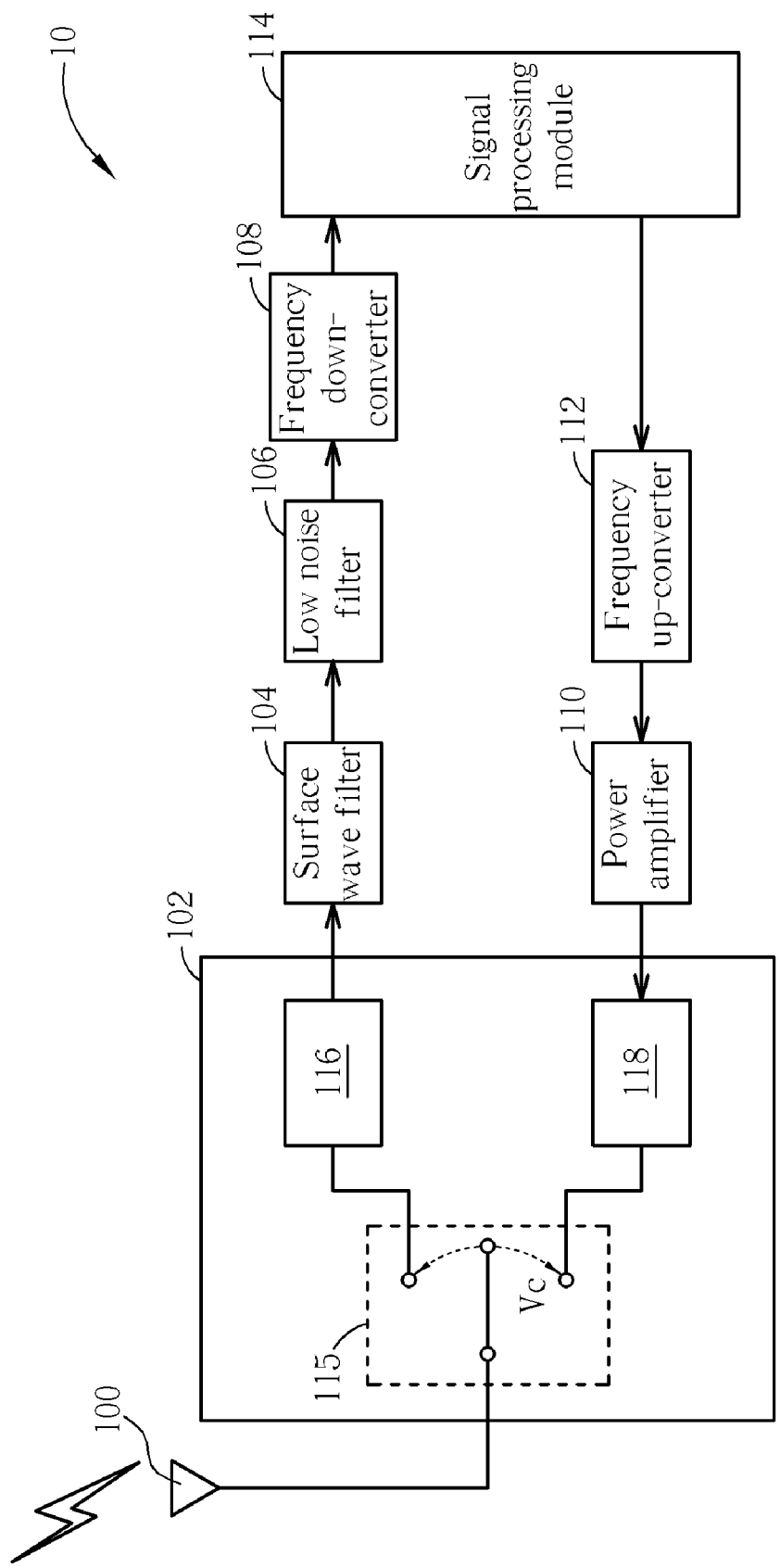
FIG. 1 is a schematic diagram of a prior art transceiver device.
Figure 2:
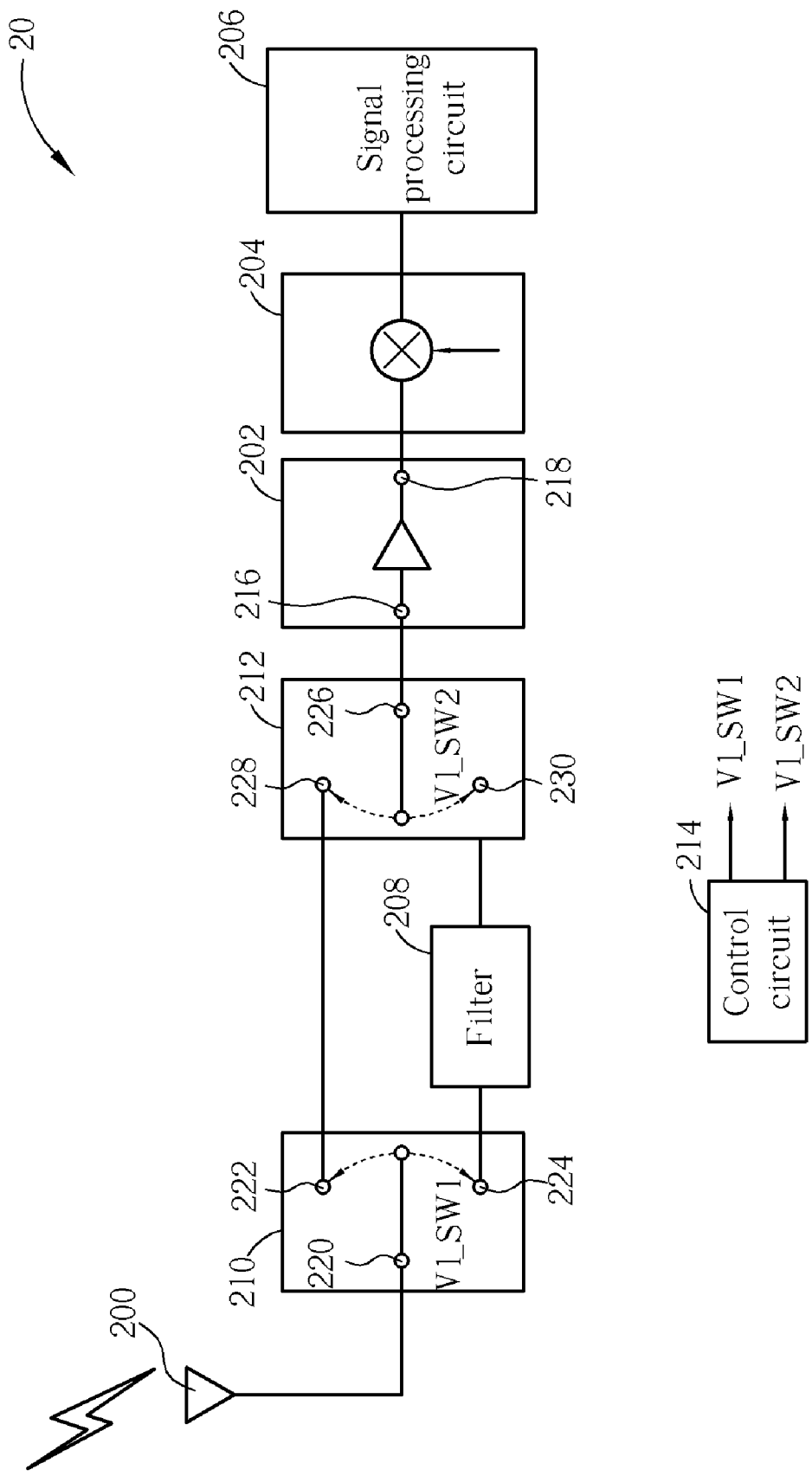
FIG. 2 is a schematic diagram of a radio-frequency reception device in accordance with a first embodiment of the present invention.

Please refer to FIG. 2, which is a schematic diagram of a radio-frequency reception device 20 in accordance with a first embodiment of the present invention. The radio-frequency reception device 20, a receiver, can enhance reception performance of a mobile communications device, such as a mobile phone or a personal digital assistant. The radio-frequency reception device 20 comprises a reception antenna 200, a low noise amplifier 202, a frequency down-converter 204, a signal processing circuit 206, a filter 208, a first switch 210, a second switch 212, and a control circuit 214. The low noise amplifier 202 comprises a first end 216 and a second end 218. The first switch 210 comprises a first end 220, a second end 222, and a third end 224. The second switch 212 comprises a first end 226, a second end 228, and a third end 230. The reception antenna 200 receives radio-frequency signals and outputs the signals to the first end 220 of the first switch 210. The filter 208 can filter unnecessary noises of the signals. The low noise amplifier 202 amplifies amplitudes of signals received by the first end 216 and outputs amplified signals from the second end 218. The frequency down-converter 204 down-converts frequencies of the signals outputted from the low noise amplifier 202. The first switch 210 can be selectively switched to be electrically connected to the second end 222 and the third end 224 according to a control signal V1_SW1 outputted from the control circuit 214, while the second switch 212 can be switched to be electrically connected to the second end 228 or the third end 230 according to a control signal V1_SW2 outputted from the control circuit 214. In the radio-frequency reception device 20, the filter 208 can filter noises, so that the filter 208 unavoidably attenuates signal power. In the present invention, when signal power is weak, lower than a predetermined level, or an emergency occurs, the control circuit 214 can control the first switch 210 and the second switch 212 to make signals received by the reception antenna 200 skipping the filter 208. Operations of the radio-frequency reception device 20 can be stated as follows.

In general cases, according to the control signals V1_SW1 and V1_SW2, the control circuit 214 switches the first end 220 of the first switch 210 to be electrically connected to the third end 224 of the first switch 210 and switches the first end 226 of the second switch 212 to be electrically connected to the third end 230 of the second switch 212. Therefore, signals received by the reception antenna 200 go through the first end 220 and the third end 224 of the first switch 210 to the filter 208 for filtering noise. Then, the filtered signals outputted from the filter 208 go to the first end 216 of the low noise amplifier 202 through the third end 230 and the first end 226 of the second switch 212. The low noise amplifier 202 amplifies the signals received by the first end 216 and outputs the amplified signals to the frequency down-converter 204 through the second end 218. The frequency down-converter 204 down-converts the frequencies of the signals to a preset range and outputs the converted signals to the signal processing circuit 206 for following signal processing procedures.

On the other hand, if the signal-reception efficiency of the radio-frequency reception device 20 has to be enhanced, the control circuit 214 can switch the first end 220 of the first switch 210 to be electrically connected to the second end 222 of the first switch 210, and switch the first end 226 of the second switch 212 to be electrically connected to the second end 228 of the second switch 212 with the control signals V1_SW1 and V1_SW2. Therefore, the signals received by the reception antenna 200 will not be filtered by the filter 208, but go through the first end 220 and the second end 222 of the first switch 210 to the second end 228 and the first end 226 of the second switch 212. In other words, the signals received by the reception antenna 200 can be directly transmitted to the first end 216 of the low noise amplifier 202. Then, the low noise amplifier 202 amplifies the signals received by the first end 216 and outputs the amplified signals to the frequency down-converter 204 through the second end 218. The frequency down-converter 204 down-converts the frequencies of the signals to a preset range and outputs the signals to the signal processing circuit 206 for the following signal processing procedures. As a result, signals received by the reception antenna 200 are transmitted to the first end 216 of the low noise amplifier 202 without passing through the filter 208. Therefore, when a user suffers emergencies, the present invention radio-frequency reception device 20 can enhance reception performance accordingly.

Figure 3:
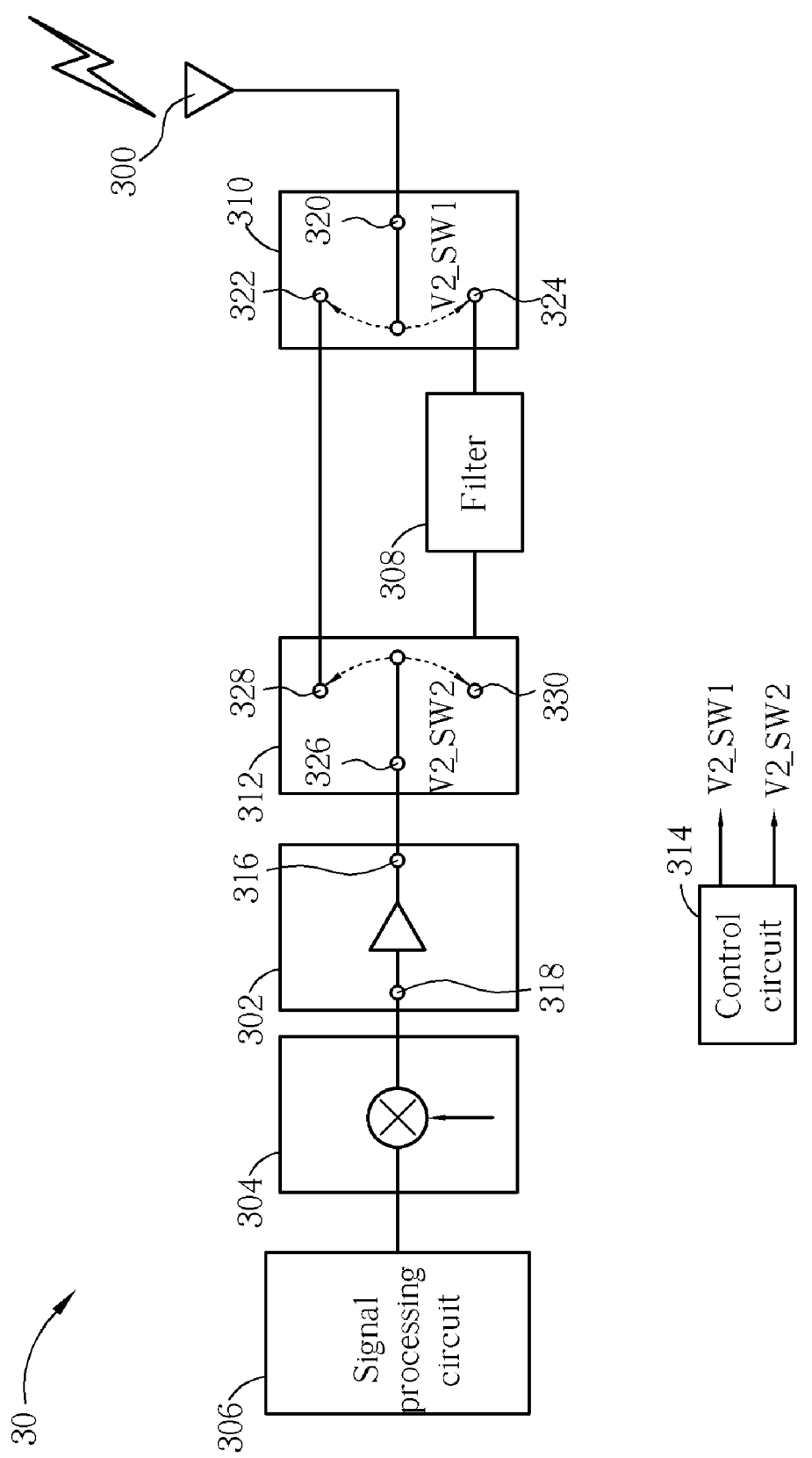
FIG. 3 is a schematic diagram of a radio-frequency transmission device in accordance with a second embodiment of the present invention.

Please refer to FIG. 3, which is a schematic diagram of a radio-frequency transmission device 30 (a transmitter) in accordance with a second embodiment of the present invention. The radio-frequency transmission device 30 can enhance transmission performance of a mobile communications device, such as a mobile phone or a personal digital assistant. The radio-frequency transmission device 30 comprises a transmission antenna 300, a power amplifier 302, a frequency up-converter 304, a signal processing circuit 306, a filter 308, a first switch 310, a second switch 312, and a control circuit 314. The power amplifier 302 comprises a first end 316 and a second end 318. The first switch 310 comprises a first end 320, a second end 322, and a third end 324. The second switch 312 comprises a first end 326, a second end 328, and a third end 330. The frequency up-converter 304 up-converts frequencies of signals outputted from the signal processing circuit 306 to a preset range, and outputs the converted signals to the second end 318 of the power amplifier 302. The power amplifier 302 can amplify amplitudes of signals received by the second end 318, and outputs the amplified signals through the first end 316. The filter 308 can filter noise. The transmission antenna 300 can transmit the signals outputted from the first end 320 of the first switch 310 into the air through the radio channels. The first switch 310 can be switched to be electrically connected to the second end 322 or the third end 324 according to a control signal V2_SW1 outputted from the control circuit 314, while the second switch 312 can be switched to be electrically connected to the second end 328 or the third end 330 according to a control signal V2_SW2 outputted from the control circuit 314. In the radio-frequency transmission device 30, the filter 308 can filter noise, so that the filter 308 unavoidably attenuates signal power. Therefore, when signal power is weak or an emergency occurs, the present invention can enhance signal power outputted from the power amplifier 302 by skipping the filter 308. Operations of the radio-frequency transmission device 30 can be stated as follows.

In general transmission cases, using the control signals V2_SW1 and V2_SW2, the control circuit 314 switches the first end 320 of the first switch 310 to be electrically connected to the third end 324 of the first switch 310, and switches the first end 326 of the second switch 312 to be electrically connected to the third end 330 of the second switch 312. Therefore, after the power amplifier 302 amplifies signal power, the filter 308 can filter noise of the signals outputted from the power amplifier 302 through the first end 326 and the third end 330 of the second switch 312. Then, the transmission antenna 300 launches the filtered signals outputted from the filter 308 through the third end 324 and the first end 320 of the first switch 310.

On the other hand, when the user suffers emergencies and decides the transmission efficiency of the radio-frequency transmission device 30 has to be enhanced, for example, the user dial an emergency number. The control circuit 314 can switch the first end 320 of the first switch 310 to be electrically connected to the second end 322 of the first switch 310, and switches the first end 326 of the second switch 312 to be electrically connected to the second end 328 of the second switch 312 with the control signals V2_SW1 and V2_SW2. Therefore, signals outputted from the power amplifier 302 are directly transmitted to the transmission antenna 300 through the first end 326 and the second end 328 of the second switch 312, and the second end 322 and the first end 320 of the first switch 310. Namely, signals outputted from the power amplifier 302 can be directly transmitted into the air by the transmission antenna 300. In other words, when the user encounter emergent situations and the transmission efficiency is needed to be enhanced, the control circuit 314 can directly transmit the signals outputted from the power amplifier 302 to the transmission antenna 300, or skip the filter 308. Therefore, the present invention radio-frequency transmission device 30 can enhance transmission performance if necessary.

As mentioned above, when the user encounters emergent situations, the radio-frequency reception device 20 shown in FIG. 2 can enhance reception performance, and the radio-frequency transmission device 30 shown in FIG. 3 can enhance transmission performance. The present invention further provides a radio-frequency signal transceiver device capable of enhancing both reception and transmission performances of a mobile communications device.

Figure 4:
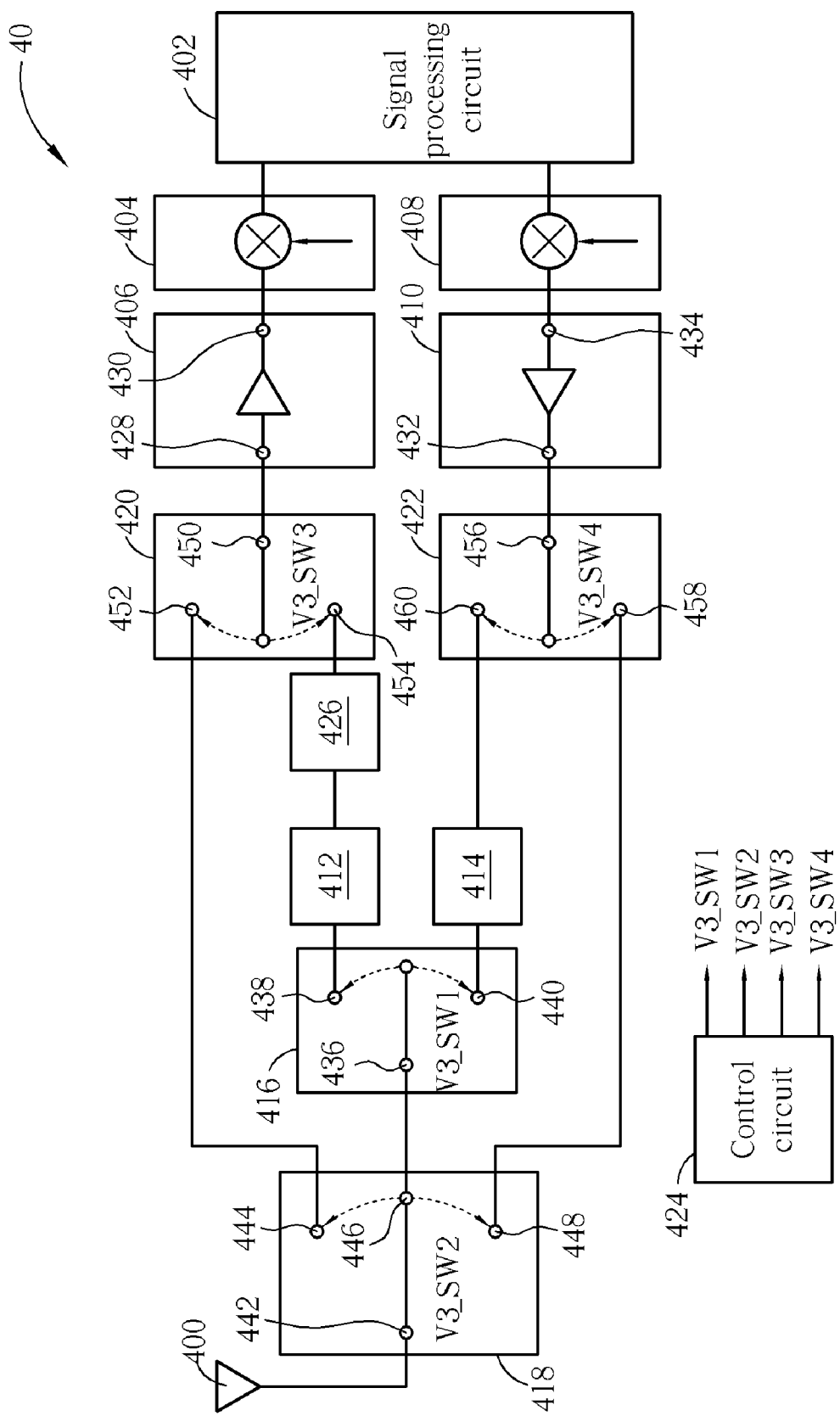
FIG. 4 is a schematic diagram of a radio-frequency transceiver device in accordance with a third embodiment of the present invention.

Please refer to FIG. 4, which is a schematic diagram of a radio-frequency signal transceiver device 40 in accordance with a third embodiment of the present invention. The radio-frequency signal transceiver device 40 can enhance reception and transmission performance of a mobile communications device, such as a mobile phone, a personal digital assistant, etc. The radio-frequency signal transceiver device 40 comprises an antenna 400, a signal processing circuit 402, a frequency down-converter 404, a low noise amplifier 406, a frequency up-converter 408, a power amplifier 410, a first filter 412, a second filter 414, a first switch 416, a second switch 418, a third switch 420, a fourth switch 422, and a control circuit 424. Besides, the radio-frequency signal transceiver device 40 preferably includes a third filter 426, such as a surface wave filter, between the first filter 412 and the third switch 420. In the radio-frequency signal transceiver device 40, the low noise amplifier 406 includes a first end 428 and a second end 430. The power amplifier 410 includes a first end 432 and a second end 434. The first switch 416 includes a first end 436, a second end 438, and a third end 440. The second switch 418 includes a first end 442, a second end 444, a third end 446, and a fourth end 448. The third switch 420 includes a first end 450, a second end 452, and a third end 454. The fourth switch 422 includes a first end 456, a second end 458, and a third end 460. Operations of the frequency down-converter 404 and the low noise amplifier 406 are similar to the frequency down-converter 204 and the low noise amplifier 202 shown in FIG. 2, and operations of the frequency up-converter 408 and the power amplifier 410 are similar to the frequency up-converter 304 and the power amplifier 302 shown in FIG. 3. Detailed descriptions will not be further narrated. Moreover, the first switch 416 can be switched to be electrically connected to the second end 438 or the third end 440 according to a control signal V3_SW1 outputted from the control circuit 424. The second switch 418 can be switched to be electrically connected to the second end 444, the third end 446 or the fourth end 448 according to a control signal V3_SW2 outputted from the control circuit 424. The third switch 420 can be switched to be electrically connected to the second end 452 or the third end 454 according to a control signal V3_SW3 outputted from the control circuit 424. The fourth switch 422 can be switched to be electrically connected to the second end 458 or the third end 460 according to a control signal V3_SW4 outputted from the control circuit 424. In the radio-frequency signal transceiver device 40, the first filter 412, the second filter 414, and the third filter 426 can filter noise, so that the filters 412, 414, and 426 unavoidably attenuate signal power. The present invention can enhance signal power received or transmitted by the antenna 400 when some situations occur, such as weak signal power or in an emergency. Signals received by the antenna 400 can be directly transmitted to the low noise amplifier 406 without passing through the first filter 412 and the third filter 426, and signals outputted from the power amplifier 410 can be directly transmitted by the antenna 400 without passing through the second filter 414. Operations of the radio-frequency signal transceiver device 40 can be stated as follows.

In general reception cases, using the control signals V3_SW1, V3_SW2 and V3_SW3, the control circuit 424 can switch the first end 436 of the first switch 416 to be electrically connected to the second end 438 of the first switch 416, the first end 442 of the second switch 418 to be electrically connected to the third end 446 of the second switch 418, and the first end 450 of the third switch 420 to be electrically connected to the third end 454 of the third switch 420. Therefore, signals received by the antenna 400 go through the first end 442 and the third end 446 of the second switch 418 and the first end 436 and the second end 438 of the first switch 416 to the first filter 412 and the third filter 426 for filtering noise. Then, signals outputted from the third filter 426 go to the first end 428 of the low noise amplifier 406 through the third end 454 and the first end 450 of the third switch 420. The low noise amplifier 406 amplifies signal power appropriately and outputs the amplified signals to the frequency down-converter 404 through the second end 430. The frequency down-converter 404 down-converts frequencies of the received signals and outputs the converted signals to the signal processing circuit 402 for following signal processing procedures.

Similarly, in general transmission cases, using the control signals V3_SW1, V3_SW2, and V3_SW4, the control circuit 424 can switch the first end 436 of the first switch 416 to be electrically connected to the third end 440 of first switch 416, the first end 442 of the second switch 418 to be electrically connected to the third end 446 of the second switch 418, and the first end 456 of the fourth switch 422 to be electrically connected to the third end 460 of the fourth switch 422. Therefore, the signal processing circuit 402 transmits signals to the frequency up-converter 408 for up-converting frequencies of the signals, and the power amplifier 410 amplifies signal power. The second filter 414 can filter noise, and then the antenna 400 transmits signals outputted from the second filter 414.

In other words, the first end 422 of the second switch 418 is electrically connected to the third end 446, so that signals received by the antenna 400 or signals-to-be-transmitted are filtered by the filters for filtering noise. On the contrary, when users encounter emergent situations, in order to enhance reception and transmission efficiencies, the present invention radio-frequency signal transceiver device 40 can control the second witch 418, the third switch 420, and the fourth switch 422 for preventing signal power being attenuated by the filters.

To enhance reception efficiency in an emergency, the control circuit 424 can switch the first end 442 of the second switch 418 to be electrically connected to the second end 444, and the first end 450 of the third switch 420 to be electrically connected to the second end 452 with the control signals V3_SW2 and V3_SW3. Therefore, signals received by the antenna 400 are directly transmitted to the low noise amplifier 406 instead of passing through the first filter 412 and the third filter 426. Therefore, signal attenuation can be reduced, so that signal reception efficiency can be enhanced.

Similarly, to enhance transmission efficiency in an emergency, the control circuit 424 can switch the first end 442 of the second switch 418 to be electrically connected to the fourth end 448, and the first end 456 of the fourth switch 422 to be electrically connected to the second end 458 with the control signals V3_SW2 and V3_SW4. Therefore, the signals outputted from the power amplifier 410 are directly transmitted to the antenna 400 instead of passing through the second filter 414. Therefore, signal attenuation can be reduced, so that transmission efficiency can be enhanced.

Therefore, to enhance transmission and reception performances of a mobile communications device in the emergency, the present invention radio-frequency signal transceiver device 40 can receive or transmit signals without passing through the filters. Moreover, in order to prevent noise interference and comply with government regulations, operations of enhancing transmission and reception performances can be held only when two situations occur, the user suffers emergencies and signal power is weak. For example, when the user dials emergency numbers ex. 112 and signal power is weak at that place, the operations of enhancing transmission and reception performances can be triggered.

Figure 5:
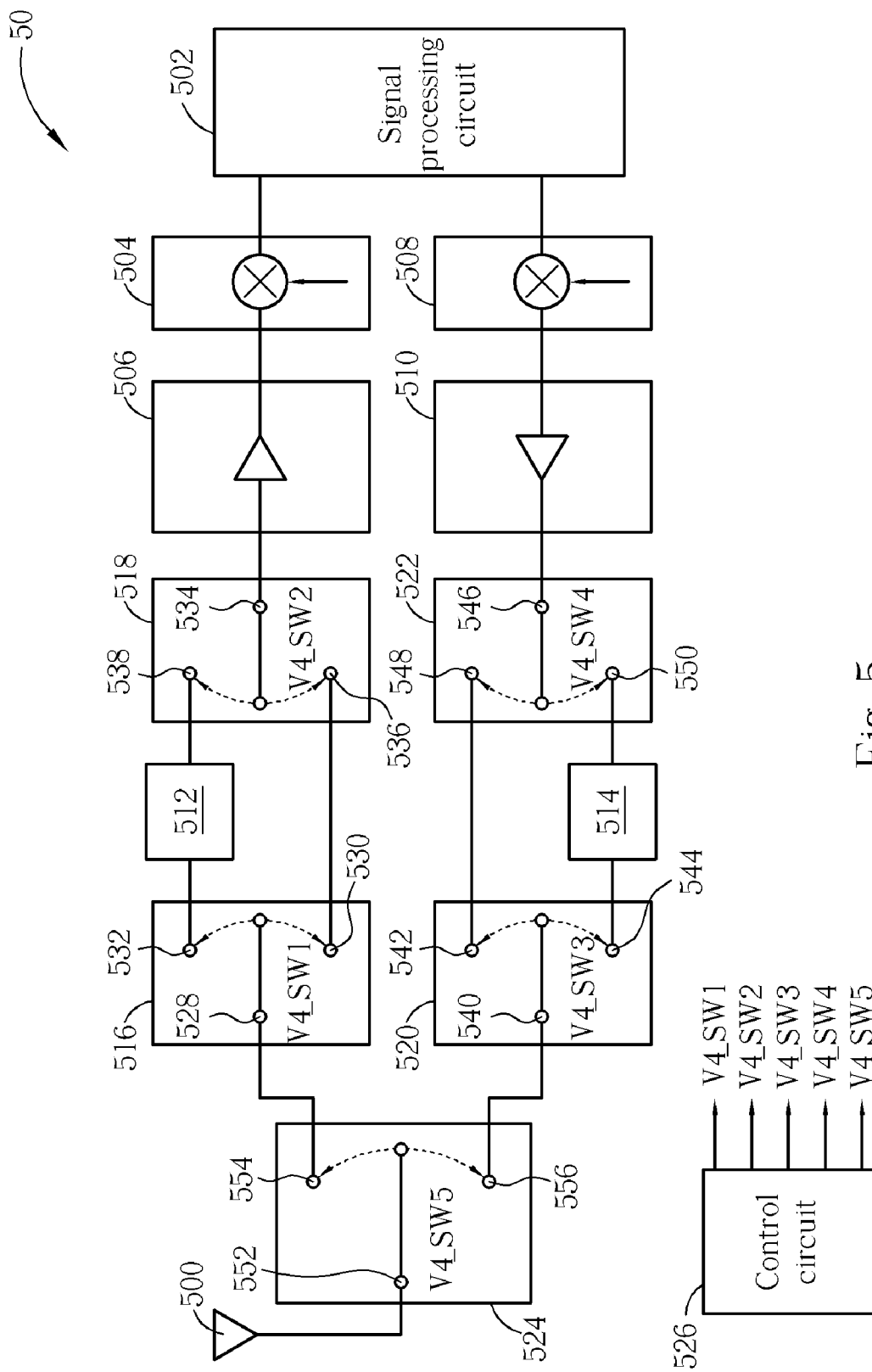
FIG. 5 is a schematic diagram of a radio-frequency transceiver device in accordance with a fourth embodiment of the present invention.

Please refer to FIG. 5, which is a schematic diagram of a radio-frequency signal transceiver device 50 in accordance with a forth embodiment of the present invention. The radio-frequency signal transceiver device 50 can enhance reception and transmission performance of a mobile communications device, such as a mobile phone or a personal digital assistant, etc. The radio-frequency signal transceiver device 50 comprises an antenna 500, a signal processing circuit 502, a frequency down-converter 504, a low noise amplifier 506, a frequency up-converter 508, a power amplifier 510, a first filter 512, a second filter 514, a first switch 516, a second switch 518, a third switch 520, a fourth switch 522, a fifth switch 524, and a control circuit 526. The first switch 516 includes a first end 528, a second end 530, and a third end 532. The second switch 518 includes a first end 534, a second end 536, and a third end 538. The third switch 520 includes a first end 540, a second end 542, and a third end 544. The forth switch 522 includes a first end 546, a second end 548, and a third end 550. The fifth switch 524 includes a first end 552, a second end 554, and a third end 556. The control circuit 526 can output the control signals V4_SW1, V4_SW2, V4_SW3, V4_SW4, and V4_SW5 to control the first switch 516, the second switch 518, the third switch 520, the fourth switch 522, and the fifth switch 524.

In the FIG. 5, operations of the frequency down-converter 504, the low noise amplifier 506, the first filter 512, the first switch 516, and the second switch 518 are similar to the frequency down-converter 204, the low noise amplifier 202, the filter 208, the first switch 210, and the second switch 212 shown in FIG. 2. Similarly, operations of the frequency up-converter 508, the power amplifier 510, the second filter 514, the third switch 520, and the fourth switch 522 are similar to the frequency up-converter 304, the power amplifier 302, the filter 308, the first switch 310, and the second switch 312 shown in FIG. 3. The detailed descriptions will not be narrated further. In general reception cases, the control circuit 526 switches the first end 528 of the first switch 516 to be electrically connected to the third end 532, the first end 534 of the second switch 518 to be electrically connected to the third end 538, and the first end 552 of the fifth switch 524 to be electrically connected to the second end 554 with the control signals V4_SW1, V4_SW2 and V4_SW5. Therefore, signals received by the antenna 500 can pass through the first filter 512 for filtering noise. In general transmission cases, the control circuit 526 switches the first end 540 of the third switch 520 to be electrically connected to the third end 544, the first end 546 of the fourth switch 522 to be electrically connected to the third end 550, and the first end 552 of the fifth switch 524 to be electrically connected to the third end 556 with the control signals V4_SW3, V4_SW4 and V4_SW5. Therefore, signals outputted from the power amplifier 510 can pass through the second filter 514 for filtering noise.

On the contrary, to enhance reception efficiency in an emergency, the control circuit 526 can switch the first end 528 of the first switch 516 to be electrically connected to the second end 530, the first end 534 of the second switch 518 to be electrically connected to the second end 536, and the first end 552 of the fifth switch 524 to be electrically connected to the second end 554 with the control signal V4_SW1, V4_SW2 and V4_SW5. Therefore, signals received by the antenna 500 will not pass through the first filter 512 for maintaining signal power. Similarly, to enhance transmission efficiency in an emergency, the control circuit 526 can switch the first end 540 of the third switch 520 to be electrically connected to the second end 542, the first end 546 of the fourth switch 522 to be electrically connected to the second end 548, and the first end 552 of the fifth switch 524 to be electrically connected to the third end 556 with the control signal V4_SW3, V4_SW4 and V4_SW5. Thus, signals outputted from the power amplifier 510 will not pass through the second filter 514 for enhancing signal power.

Therefore, to enhance transmission and reception efficiencies when the user suffers the emergency, the present invention radio-frequency signal transceiver device 50 can receive or transmit signals without passing through the filters. Moreover, in order to prevent noise interference and comply with the regulations, the radio-frequency signal transceiver device 50 can be set to switch on the operations only when two situations occur, the user suffers the emergency and signal power is weak. For example, when the user dial emergency numbers ex. 112 and signal power is weak, the operations can be triggered.

As mentioned above, in order to enhance transmission and reception efficiencies when the user suffers the emergency, the present invention can make received signals and signals-to-be-transmitted not passing through the filters by controlling the switches.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver of a mobile device comprising:
an antenna for receiving signals;
a first switch comprising a first end coupled to the antenna, a second end, and a third end;
a filter coupled to the third end of the first switch;
a second switch comprising a first end, a second end and a third end, the second end of the second switch coupled to the second end of the first switch, and the third end of the second switch coupled to the filter;
a low noise amplifier coupled to the first end of the second switch for amplifying the signals received by the second switch; and
a control circuit for controlling the first and the second switches to selectively pass the signals through the filter.

2. The receiver of claim 1 further comprising:
a frequency down-converter coupled to the low noise amplifier for down-converting frequencies of signals outputted from the low noise amplifier; and
a signal processing circuit coupled to the frequency down-converter for performing signal processing.

3. The receiver of claim 1, wherein when power of the signals is lower than a predetermined level, the control circuit controls the first and the second switches without passing the signals through the filter.

4. A transmitter of a mobile device comprising:
a signal processing circuit for generating signals;
a second switch comprising a first end coupled to the signal processing circuit, a second end, and a third end;
a filter coupled to the third end of the second switch;
a antenna;
a first switch comprising a first end coupled to the antenna, a second end coupled to the second end of the second switch and a third end coupled to the filter; and
a control circuit for controlling the first and second switches to selectively pass the signals through the filter.

5. The transmitter of claim 4 further comprising:
a frequency up-converter coupled to the signal processing circuit for up-converting frequencies of signals outputted from the signal processing circuit; and
a power amplifier coupled to the frequency up-converter for amplifying power of received signals and sending to the second switch.

6. The transmitter of claim 4, wherein the mobile device is a mobile phone, when inputting an emergency number to the mobile phone, the control circuit controls the first and the second switches without passing the signals through the filter.

7. A mobile device comprising:
an antenna for receiving and transmitting signals;
a signal processing module comprising a baseband module, a receiving module, and a transmitting module;
a first switch;
a second switch comprising a first end coupled to the antenna, and a second end coupled to the first switch;
a first filter coupled to the first switch;
a second filter coupled to the first switch;
a third switch comprising a first end coupled to the signal processing module, a second end coupled to the second switch, and a third end coupled to the first filter;
a fourth switch comprising a first end coupled to a signal processing module, a second end coupled to second switch, and a third end coupled to the second filter; and
a control circuit for controlling the first switch, the second switch, the third switch, and the fourth switch.

8. The mobile device of claim 7, wherein the signal processing module comprises:
a frequency down-converter for down-converting signal frequencies for the baseband module; and
a low noise amplifier comprising a first end coupled to the third switch, and a second end coupled to the frequency down-converter.

9. The mobile device of claim 7, wherein the signal processing module comprises:
a frequency up-converter for up-converting frequencies of signals outputted from the baseband module; and
a power amplifier comprising a first end coupled to the fourth switch, and a second end coupled to the frequency up-converter.

10. The mobile device of claim 7 further comprising a third filter coupled between the first filter and the third end of the third switch.

11. A mobile device comprising:
an antenna for selectively receiving and transmitting signals;
a signal processing module comprising a baseband module, a receiving module, and a transmitting module;
a first switch;
a first filter coupled to the first switch;
a second switch comprising a first end coupled to the receiving module, a second end coupled to the first switch, and a third end coupled to the first filter;
a third switch;
a second filter coupled to the third switch;
a fourth switch comprising a first end coupled to the signal processing module, a second end coupled to the third switch, and a third end coupled to the second filter;
a fifth switch comprising a first end coupled to the antenna, a second end coupled to the first switch, and a third end coupled to the third switch; and
a control circuit for controlling the first switch, the second switch, the third switch, the fourth switch, and the fifth switch.

12. The mobile device of claim 11, wherein the receiving module comprises:
a frequency down-converter for down-converting signals frequencies for the baseband module; and
a low noise amplifier comprising a first end to the second switch, and a second end coupled to the frequency down-converter.

13. The mobile device of claim 11, wherein the transmitting module comprises:
a frequency up-converter for up-converting frequencies of signals outputted from the baseband module; and
a power amplifier comprising a first end coupled to the fourth switch, and a second end coupled to the frequency up-converter.

* * * * *